United States Patent
Fukatsu

(12) 
(10) Patent No.: US 6,492,961 B1
(45) Date of Patent: *Dec. 10, 2002

(54) IMAGE FORMING DEVICE AND TOUCHLESS DISPLAY SWITCH

(75) Inventor: Hirokazu Fukatsu, Nagoya (JP)

(73) Assignee: Tietech Corporation, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/285,307

(22) Filed: Apr. 2, 1999

Related U.S. Application Data

(63) Continuation of application No. 08/567,075, filed on Dec. 4, 1995, now Pat. No. 5,892,491.

(30) Foreign Application Priority Data

Dec. 5, 1994 (JP) .............................................. 6-333727

(51) Int. Cl.[7] ................................................. G09G 3/00
(52) U.S. Cl. ............................. 345/32; 359/40; 359/41
(58) Field of Search ................................ 345/173, 175, 345/156, 158; 359/40, 41, 478, 631

(56) References Cited

U.S. PATENT DOCUMENTS

| | | | | |
|---|---|---|---|---|
| 3,609,695 A | * | 9/1971 | Pirkle ........................ | 345/175 |
| 3,658,407 A | * | 4/1972 | Kitano et al. ................ | 358/116 |
| 3,765,741 A | * | 10/1973 | Kimura et al. ............... | 350/3.5 |
| 3,909,823 A | * | 9/1975 | Knowlton ................... | 340/336 |
| 4,060,307 A | * | 11/1977 | Demaine et al. ............. | 345/32 |
| 4,264,130 A | * | 4/1981 | Ogura ........................ | 345/175 |
| 4,553,842 A | * | 11/1985 | Griffin ....................... | 345/175 |
| 4,692,809 A | * | 9/1987 | Beining et al. .............. | 345/175 |
| 4,893,120 A | * | 1/1990 | Doering et al. .............. | 345/175 |
| 4,945,348 A | * | 7/1990 | Ibamoto et al. ............. | 345/104 |
| 5,396,351 A | * | 3/1995 | Gessel ........................ | 349/159 |
| 5,504,597 A | * | 4/1996 | Sprague et al. ............... | 359/40 |
| 5,504,598 A | * | 4/1996 | Sprague et al. ............... | 359/41 |
| 5,513,041 A | * | 4/1996 | Togino ....................... | 359/631 |
| 5,519,533 A | * | 5/1996 | Nomura et al. ............. | 359/478 |
| 5,550,656 A | * | 8/1996 | Sprague et al. ............... | 359/40 |
| 6,031,519 A | * | 2/2000 | O'Brien ...................... | 345/156 |
| 6,043,805 A | * | 3/2000 | Hsieh ......................... | 345/158 |

FOREIGN PATENT DOCUMENTS

JP 56 094305 7/1981

OTHER PUBLICATIONS

Applied Optics, vol. 19, No. 7, Apr. 1, 1980, New York—pp. 1105–1112, Kawazu M et al.: "Application of Gradient—Index Fiber Arrays to Copying Machines".

* cited by examiner

*Primary Examiner*—Amare Mengistu
(74) *Attorney, Agent, or Firm*—Patterson, Thuente, Skaar & Christensen

(57) ABSTRACT

An image forming device is adapted for placement on a surface on which pictures or characters are drawn or displayed. The image forming device includes a lens member including a plurality of distributed-index rod-like lens elements disposed in juxtaposed relationship with each other in a matrix-like arrangement and operable to map the pictures or characters as a visual real image on substantially one image plane in the air spaced from the surface. A touch-less display switch for use with a display device includes a sensor in addition to the lens member as in the image forming device. The sensor has a detection area corresponding to at least a part of the formed image on the image plane and operable to detect an object entering the detection area in a non-contact manner.

35 Claims, 4 Drawing Sheets

IMAGE FORMING DEVICE AND TOUCHLESS DISPLAY SWITCH

This application is a continuation application of U.S. Ser. No. 08/567,075 filed Dec. 4, 1995 now U.S. Pat. No. 5,892,491.

BACKGROUND OF THE INVENTION

1. Field of the Invention

The present invention relates to an image forming device for forming in the air an image of pictures or characters drawn or displayed on a surface, and also relates to a touch-less display switch which utilizes such an image forming device.

2. Description of the Prior Art

Conventionally, static or animated pictures or characters displayed on a picture plane of a display device are adapted to be observed by an observer while he visually recognizes the picture plane itself through a surface structure of the display device.

However, such pictures or characters are those merely displayed on the picture plane, and they lack amusingness.

In addition, various kinds of display switches called "touch-panel switches" have been proposed. In general, such switches are disposed on an upper surface of a display device and have a common basic construction which includes a contactor or a specific member having a variable impedance covered by a transparent sheet. The contactor is normally made of a transparent electrode.

Here, the term "touch-panel switch" means a multi-function switch (operable as an input/output terminal as well as a switch) which is operable to open and close its contact when an operator touches or pushes a transparent sheet (or a contact) of the switch with his finger(s), or when the finger(s) of the operator is moved away from the transparent sheet after contacting the same.

Since, with the conventional touch-panel switch, the operator has to touch the transparent sheet of the switch after he visually recognizes keys which are displayed on a picture surface of the display device and which are positioned at the back of the transparent sheet, there has been a serious drawback that the transparent sheet tends to be stained in addition to the drawbacks of lack in amusingness of the display device itself.

Further, for the reason of stains, the conventional touch-panel switch is not suitable for use as an input/output terminal for an instrument or an apparatus in which particular consideration should be given to sanitary aspect.

For example, as for an operation switch for a medical instrument, it is often desirable that the switch is turned on and off while the operator does not touch the switch. As is well known, in recent years, nosocomial infection by virus has been a serious problem. Thus, the conventional touch-panel switch is not appropriate to be used where it is not suitable for uses where the operator directly touches a switch (or its keys).

SUMMARY OF THE INVENTION

It is, accordingly, an object of the present invention to provide an image forming device which serves to form an image of pictures or characters in a visually specific manner.

It is another object of the present invention to provide a touch-less display switch which permits an operator to operate the switch without touching the switch while the operator visually recognizes an image of keys of the switch which has been formed in a special form.

It is a further object of the present invention to provide a touch-less display switch which does not cause stains on the switch or keys as well as fingers of an operator when the switch is operated.

It is a still further object of the present invention to provide a touch-less display switch which is advantageously used as an input/output terminal of an instrument where particular consideration should be given to sanitary aspect.

According to a first aspect of the present invention, there is provided an image forming device for placement on a surface on which pictures or characters are drawn or displayed, comprising a lens member including a plurality of distributed-index rod-like lens elements disposed in juxtaposed relationship with each other in a matrix-like arrangement and operable to map the pictures or characters as a visual real image on substantially one image plane in the air spaced from said surface.

With the first aspect, for example, static or animated pictures or characters displayed on a picture surface of a display device are mapped by the lens member as a visual real image in the air space from the picture surface. Thus, an observer or an operator can observe the image in the air risen from the actual picture surface, so that the image thus obtained is very unique and provides excellent view.

According to a second aspect of the present invention, there is provided a touch-less display switch for use in combination with a display device, comprising:

a lens member including a plurality of distributed-index rod-like lens elements disposed in juxtaposed relationship with each other in a matrix-like arrangement. and operable to map pictures or characters displayed on a picture surface of the display device as a visual image on substantially one image plane in the air in spaced relationship with the picture surface; and a sensor having a detection area corresponding to at least a part of the mapped image on said image plane and operable to detect an object entering said detection area in a non-contact manner.

The lens elements may have a predetermined length and having flat upper and lower ends, so that the lens member has flat upper and lower surfaces.

The lens member is positioned above the display device such that the pictures or characters displayed by the display device are mapped on the image plane as a visual real image in the air above the lens member.

When an object such as a finger(s) of an operator enters the detection area of the sensor positioned on or adjacent the image plane of the mapped image, the sensor detects the position of the object or a particular area part (one of area parts of the detection area) to which the position of the object belongs.

The pictures or characters displayed by the display device may include a plural kind of keys, so that the keys are mapped on the image plane in the air by means of the lens member. Thus, the operator can visually recognize the image of the keys floating in the air and can move his finger to touch or select either one of the keys as the visual image. When the finger of the operator enters the particular area part of the detection area of the sensor corresponding to the selected key, the sensor outputs a corresponding output signal.

The output signal from the sensor may be used for converting the pictures or characters currently displayed by the display device into another ones and may be also used for controlling a suitable device or instrument associated with the switch.

The invention will become more apparent from the appended claims and the description as it proceeds in connection with the drawings.

DETAILED DESCRIPTION OF THE PREFERRED EMBODIMENT

Embodiments of the present invention will now be explained with reference to the accompanying drawings.

Figure 1:
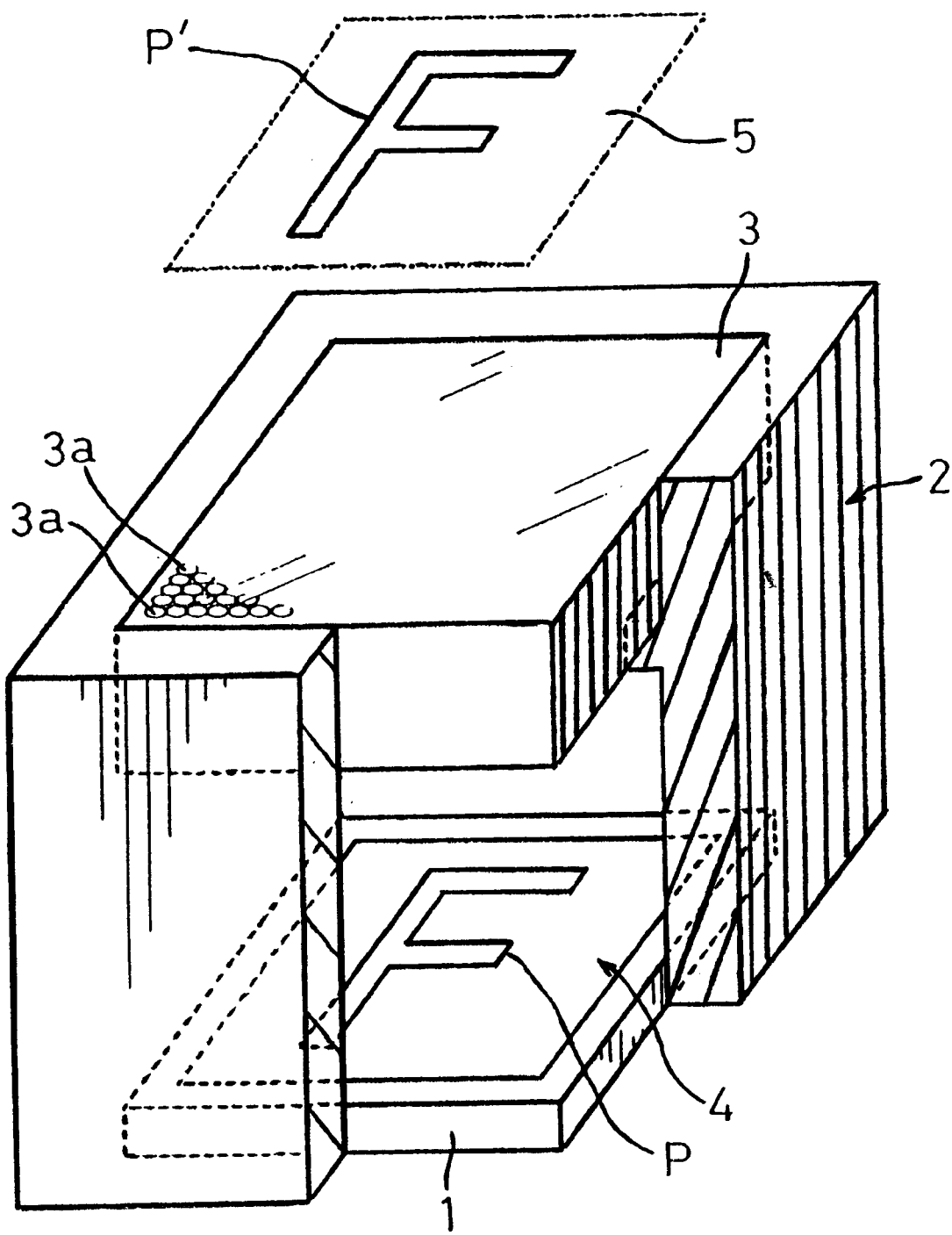
FIG. 1 is a perspective view, with a part broken away, of an image forming device according to an embodiment of the present invention.

Referring to FIG. 1, shown therein is an embodiment of an image forming device according to the present invention. As shown therein, the image forming device is mounted on a display device 1. The display device may be of any desired kind and size. Further, the display device may display merely static pictures or may display animated pictures.

The image forming device has a rectangular tubular body 2 having an open top and open bottom. A lens member 3 is fixedly mounted within an upper end portion of the body 2. The lens member 3 is constituted of a plurality of rod-like lens elements 3a arranged in juxtaposed relationship with each other in a matrix-like arrangement. Each of the lens elements 3a is cut to have a predetermined length and to have flat upper and lower end surfaces, so that the lens member 3 has flat upper and lower end surfaces. The upper end surface of the lens member 3 is substantially flush with the upper end surface of the body 2.

Here, each of the lens elements 3a is a lens called "distributed-index lens" and has a refractive index distribution which is symmetrical with respect to the longitudinal central axis of the lens. More specifically, the refractive index distribution has a parabolic configuration in which the refractive index increases toward the central axis. With this arrangement, each of the lens elements 3a may produce at a predetermined position an erecting real image of its corresponding part of an object (the pictures or characters displayed by the display device 1 in this embodiment) positioned in a predetermined position.

With this embodiment, the vertical position of the lens member 3 relative to the display device 1 or the mounting height of the lens member 3 on the display device 1 is determined such that a picture surface 4 of the display device 1 corresponds to an object plane on which an image is mapped by the lens member 3. In other words, the lens member 3 is positioned such that the lens member 3 is capable of forming an image of the pictures or characters displayed on the picture surface 4.

With this construction, the image of the picture or character displayed on the picture surface 4 of the display device 1 is formed by the lens member 3 as a real erecting image on a flat image plane 5 in the air above the lens member 3.

Figure 2:
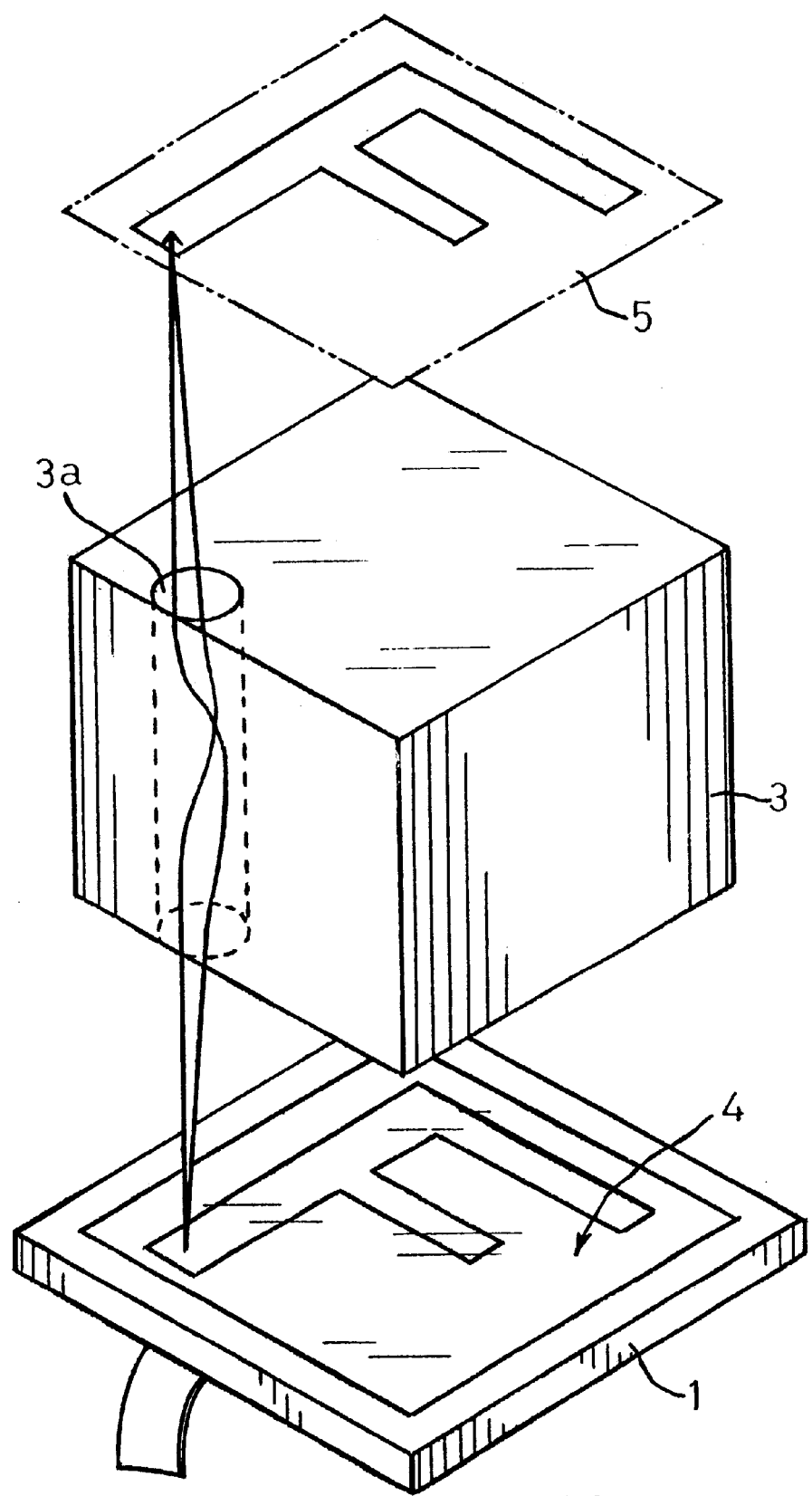
FIG. 2 is a schematic view illustrating the principle of the image forming device shown in FIG. 1.

The principal of formation of the image by the lens member 3 is illustrated in FIG. 2. As shown in FIG. 2, each part of a picture or a character P (character "F" in this case) displayed on the picture surface 4 of the display device I is mapped by the corresponding lens element 3a facing thereto as a real image on the image plane 5, so that the mapped images as a whole form an erect real image P' having the same size as the character P.

More specifically, lights from one point on the picture surface 4 enter the lower end of the lens element 3a. The lights then move in a zigzag fashion within the lens element 3a and thereafter exit the upper end of the lens element 3a. The outgoing lights pass through one point on the image plane 5, so that the image of the picture part at one point on the picture surface 4 is formed on the corresponding point on the image plane 5.

Thus, an operator or an observer can observe the image P' floating in the air above the actual picture surface 4, so that a visually very unique and beautiful display can be attained.

Although in the above embodiment, the image forming device is used with the display device 1, other than the use in combination of the display device 1, the image forming device may be placed on a surface of a sheet on which a picture or character is drawn, so that a floating image of the picture or the character can be obtained.

Figure 4:
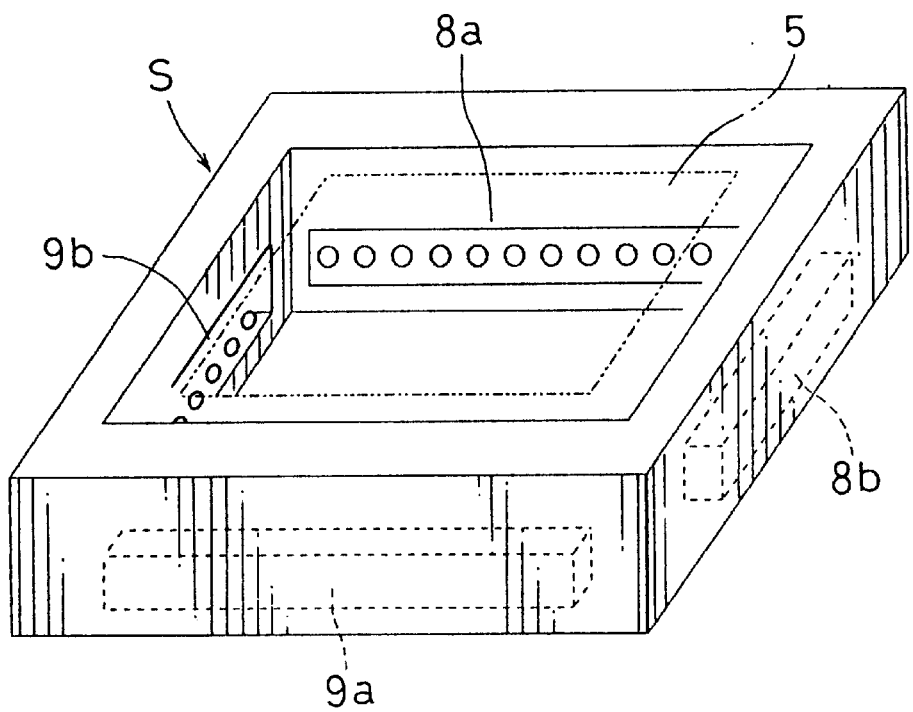
FIG. 4 is an enlarged perspective view of a sensor shown in FIG. 3.
Figure 5:
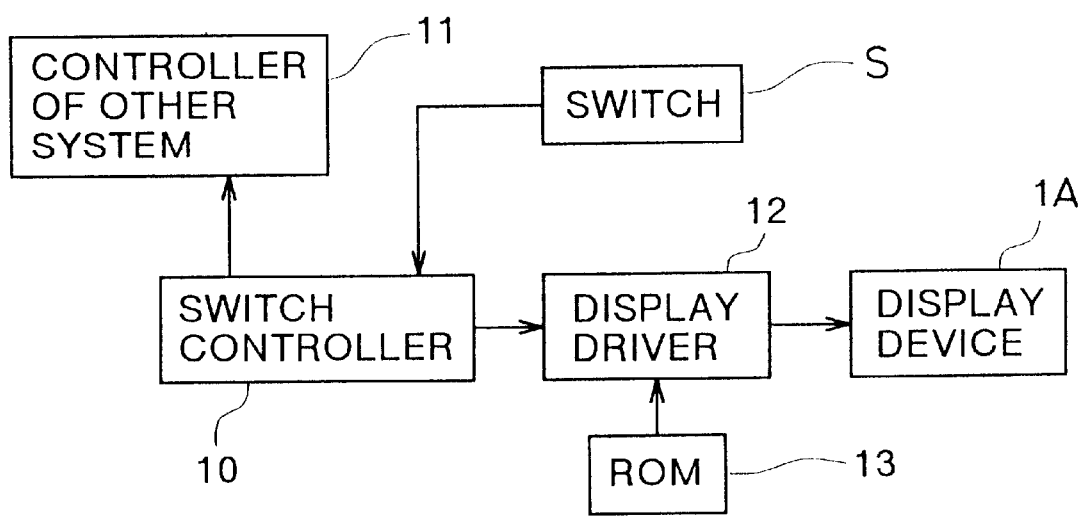
FIG. 5 is a block diagram of a control system for the display device.

An embodiment of a touch-less display switch according to the present invention will now be explained with reference to FIGS. 3 to 5.

Figure 3:
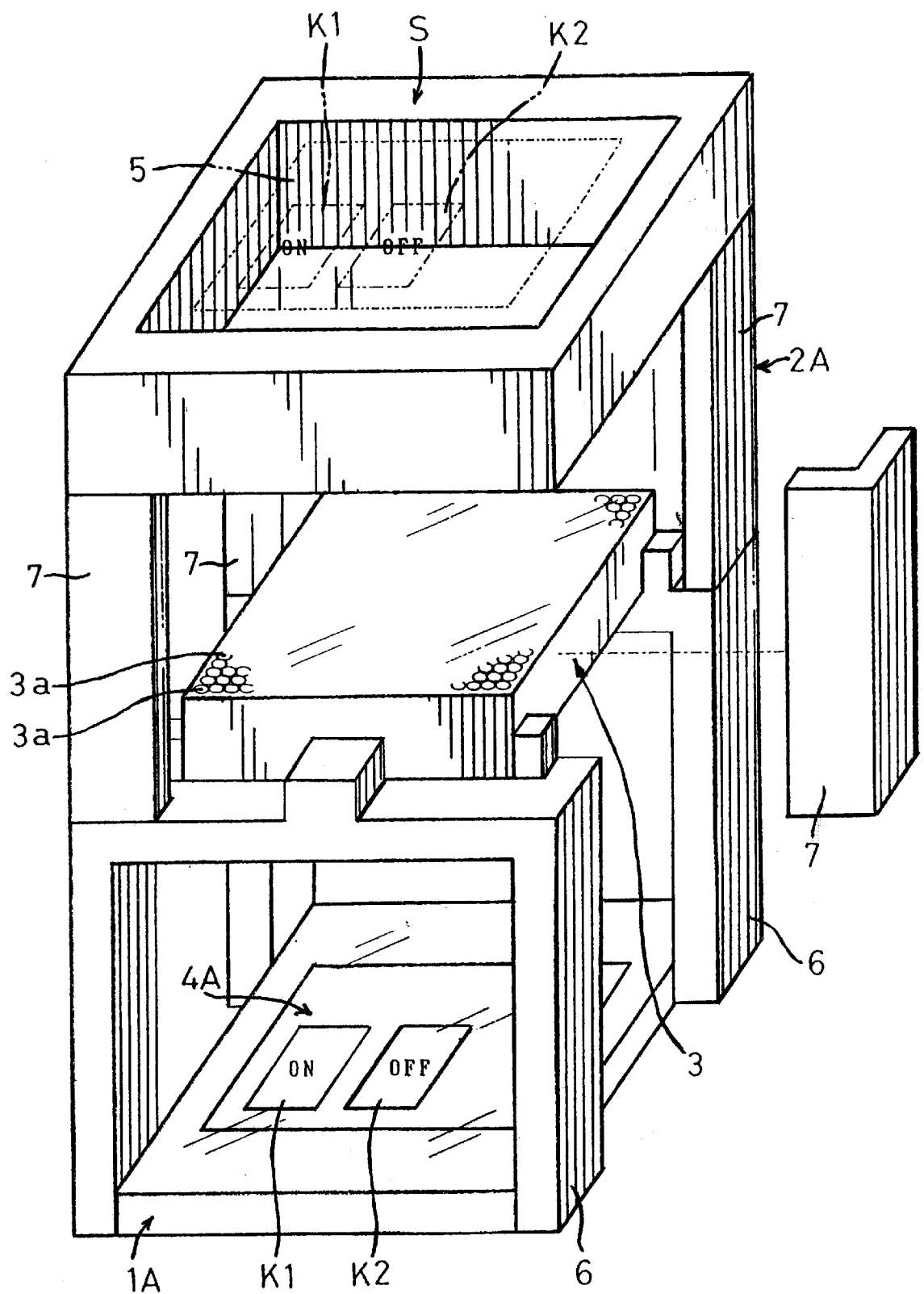
FIG. 3 is a perspective view, with a part omitted, of a touch-less display switch according to an embodiment of the present invention.

Referring to FIG. 3, there is shown a touch-less display switch mounted on a display device 1A. Here, the switch of this embodiment is a multi-functional switch acting also as an input/output terminal. The display device 1A may be of any desired kind and size.

The touch-less display switch has a frame-like body 2A including a lens support frame 6 and a sensor support frame 7. The lens support frame 6 is fixed to the display device A for fixedly supporting the lens member 3 as in the embodiment of the image forming device. The lens member 3 is positioned in spaced relationship with a picture surface 4A of the display device 1A by a predetermined distance in a vertical direction. The sensor support frame 7 is fixed to the upper portion of the lens support frame 6 and fixedly supports a non-contact sensor S which will be explained later. In FIG. 3, the sensor support frame 7 is shown, with one of its frame members removed, for easy understanding of the construction of the switch.

The material, the construction and the configuration of the body 2A may be suitably determined according to the design of the switch. For example, although the body 2A of this embodiment has open lateral sides as well as open top and bottom, the body 2A may have a rectangular tubular configuration having closed lateral walls and having open top and bottom as with the body 2 of the embodiment of the image forming device.

With this embodiment, similar to the embodiment of the image forming device, the vertical position of the lens member 3 is determined such that the picture surface 4A of the display device 1A corresponds to an object plane which is mapped by the lens member 3.

The non-contact sensor S is mounted on the open top of the sensor support frame 7 and has a square frame-like configuration to form a detecting area therewithin. The mounting height of the sensor S is determined such that an image plane S (indicated by two-dotted lines in FIG. 3) of the image mapped by the lens member 3 is positioned within the vertical height of the detecting area or is positioned adjacent the detecting area.

The construction of the sensor S will now be explained with reference to FIG. 4. In this embodiment, the sensor S is an optical sensor of transmission type and includes a first light emitter array 8a, a first light receptor array 9a facing to the first light emitter array 8a, a second light emitter array 8b, and a second light receptor array 9b facing to the second light emitter array 8b. (The detailed construction of the sensor S and its related wiring diagram are omitted.). Each of the first light emitter array 8a and the second light emitter array 8b includes a plurality of light emitters such as LED's and semiconductor laser radiators. Each of the first light receptor 9a and the second light receptor 9b includes a plurality of light receptors such as phototransistors and photocells. The first and second light emitter arrays 8a and 8b emit lights at the same vertical height so as to provide the detecting area as described above.

With this construction, when an object such as a finger of the operator enters the detecting area of the sensor S, the lights from the first and second light emitter arrays 8a and 8b are interrupted at the position where the object exists, so that the sensor outputs an output signal corresponding to the coordinate position of the object.

The output signal from the sensor S is utilized to change a predetermined part of the picture or character displayed by the display device 1A to another one, so that the display device 1A shows the switched state of the switch. A control system including a switch controller 10 is provided for performing such control of the display device 1A and will now be explained with reference to FIG. 5 showing a block diagram of the control system.

When the detected position of the object is within an ON area part of the detecting area which corresponds to a picture of a key K1 labeled "ON" and displayed by the display device 1 for an OFF area part of the detecting area which corresponds to a picture of a key K2 labeled "OFF" and displayed by the display device 1A (see FIG. 3), the switch controller 10 which is connected to the sensor S for receiving output signals from the sensor S outputs a control signal in response to the particular area part. For example, if the detected position is within the ON area part, the switch controller 10 outputs a control signal to a controller 11 of a system such as a machine tool and a medical instrument associated with the switch, and also outputs a similar control signal to a driver 12 of the display device 1A. A ROM 13 is connected to the driver 12 and stores data of various pictures or characters to be displayed by the display device 1A. Based on the control signal from the switch controller 10, the driver 12 takes out from the ROM 13 the data of a different picture than that currently displayed by the display device I and transmits the same to the display device 1A for displaying the different picture on the display device 1A. For example, if the detected position is within the ON area part, the display device 1A displays the picture of a moving actuator. On the other hand, if the detected position is within the OFF area, the display device 1A displays the picture.

As described above, with the above embodiment, similar to the embodiment of the image forming device, the visible real image floating in the air is formed on the image plane 5.

When the operator moves his finger to touch the key K1 or K2 formed as the visual image on the image plane 5 and then insert his finger into the ON or OFF area part of the detection area of the sensor S, the sensor S outputs the corresponding output signal to change the picture of the display device 1A. This means that the switch can be turned on and off without being touched by the operator.

Thus, the operator can select the key K1 or K2 displayed by the display device 1 in a non-contact manner. Therefore, the picture surface 4A of the display device 1A as well as the finger of the operator may not be stained. Consequently, the switch of this embodiment functions as a multi-functional switch acting also as an input/output terminal of the associated system, and is advantageous in sanitary aspect.

Although, in the above embodiment, the sensor S is a transmission-type optical sensor, a reflection type optical sensor may be used as the sensor S. In such a case, the sensor S may include at least one light emitter and a plural number of light receptors. The light emitter and the light receptors are arranged such that the lights emitted from the light emitter and reflected on an object or a finger which enters the image plane 5 enter any of the light receptors.

More specifically, at least one light emitter is positioned around the lens element 3 for emitting lights to pass through the overall detecting area on or adjacent the image plane 5. The light receptors are mounted on or adjacent the picture surface 4A of the display device 1A and are positioned to correspond to different area parts of the detecting area.

When the lights are emitted from the light emitter and are reflected on the object or the finger which enters one of the area parts of the detecting area, any of the reflected lights may pass through the lens member 3 and enter one of the light receptors corresponding to such an area part.

Thus, the reflection-type sensor can be used as the sensor S for detecting the object or the finger which enters the detection area.

In addition, other than the optical sensor, an ultrasonic sensor or other types of sensors may be used as the sensor S as long as it can detect the position of the object in a non-contact manner.

Further, the detecting area of the sensor S as well as the particular area part such as the ON area part or the OFF area part of the detecting area for outputting the control signal may be selectively determined according to the design of the display device 1A.

While the invention has been described with reference to preferred embodiments thereof, it is to be understood that modifications or variation may be easily made without departing from the spirit of this invention which is defined by the appended claims.

What is claimed is:

1. An image forming device comprising a lens member including a plurality of distributed-index rod-like lens elements disposed in juxtaposed relationship with each other in matrix-like arrangement, wherein each lens -element has a central axis and a parabolic refractive index distribution, wherein the parabolic refractive index distribution of each lens element increases toward the central axis of the lens element, and means for spacing the lens member from a surface on which pictures of characters are drawn or displayed, wherein the lens member and spacing means are arranged and constructed to map the pictures or characters as a visual real image on substantially one image plane in the air spaced from the lens member.

2. The image forming device as defined in claim 1 wherein said surface is a picture surface of a display device.

3. A touch-less display switch for use in combination with a display device, comprising:

lens means including a plurality of distributed-index rod-like lens elements disposed in juxtaposed relationship with each other in a matrix-like arrangement and operable to map pictures or characters displayed on a picture surface of the display device as a visual image on substantially one image plane in the air in spaced relationship with the picture surface of the display device; and sensor means having a detection area corresponding to at least a part of the mapped image on said image plane and operable to detect an object entering said detection area in a non-contact manner.

4. The touch-less display switch as defined in claim 3 wherein said detection area is positioned at substantially the same level as said image plane.

5. The touch-less display switch as defined in claim 3 wherein said detection area includes a plurality of area parts, and wherein said sensor means is operable to output an output signal corresponding to each of said area parts.

6. The touch-less display switch as defined in claim 5 further comprising control means for converting the pictures or characters displayed on the picture surface of the display device into different pictures or characters in response to the output signal from said sensor means.

7. The touch-less display switch as defined in claim 3 wherein said sensor means is operable to detect a finger of an operator which enters said detection area.

8. The touch-less display switch as defined in claim 3 wherein the picture surface of the display device extends in a flat plane, wherein said lens means includes flat upper and lower surfaces extending in parallel with the picture surface of the display device, and wherein said lens elements have the same axial length and have flat upper ends and flat lower ends to form said upper and lower surfaces of said lens means.

9. The touch-less display switch as defined in claim 3 further including a switch body disposed on the display device for supporting said lens means therewithin, said switch body having an open top for mounting thereon said sensor means and having an open bottom confronting the picture surface of the display device.

10. The touch-less display switch as defined in claim 9 wherein said sensor means includes a frame-like member mounted on said open top of said switch body and includes a plurality of sensor elements mounted on said frame member, and wherein said image plane is determined within the height of said frame member.

11. An image forming device comprising a lens having a first side and a second side and a plurality of lens elements disposed as a matrix between the first and second sides, a lens support frame supporting the lens such the first side of the lens is spaced from a surface having pictures or characters, the lens elements and the lens support frame being arranged and constructed to form a visual image of the pictures or characters floating in space above the second side of the lens, and a non-contact sensor disposed within a plane containing the visual image.

12. An image forming device as in claim 11, wherein the plurality of lens elements are a plurality of distributed-index lens elements.

13. An image forming device as in claim 11, wherein the plurality of lens elements are a plurality of substantially rod-shaped lens elements.

14. An image forming device as in claim 11, wherein the plurality of lens elements are a plurality of substantially rod-shaped, distributed-index lens elements.

15. A touch-less display switch for use in combination with a display device, comprising:

a lens member positioned such that the lens member is capable of mapping pictures or characters displayed on a picture surface of the display device as a visual image on substantially one image plane in the air in a spaced relationship with the picture surface of the display device; and a sensor having a detection area corresponding to at least a part of the mapped image on said image plane and operable to detect an object entering said detection area in a non-contact manner.

16. A device, comprising:

a display device;

a matrix of lens elements disposed in a juxtaposed relationship;

a support frame supporting the lens elements in a spaced relationship with respect to the display device such that an image displayed on the display device is formed into a real image within an image plane by the lens elements; and a touch-less display switch comprising a non-contact sensor disposed within the image plane.

17. The device of claim 16, in which said lens elements are rod-like, distributed-index lens elements.

18. The device of claim 17, each lens elements having a central axis, wherein said lens elements have a parabolic refractive index distribution increasing toward the lens element central axis.

19. The device of claim 16, the display device comprising a display surface, and in which said real image formed by the lens elements is planar.

20. The device of claim 16, said lens elements displaying flat upper and lower ends.

21. The device of claim 16, in which said lens elements are disposed above the display device such that the image is mapped above said display device.

22. The device of claim 16, in which the real image formed by the lens elements has the same size as the image displayed on the display device.

23. The device of claim 16, wherein the lens support frame supports and positions said lens elements above the display device.

24. The device of claim 16, comprising first and second light emitter arrays and first and second light receptor, arrays, the first and second light receptor arrays position to receive light from the respective first and second light emitter arrays.

25. The device of claim 24, the first and second emitter arrays and the first and second light receptor arrays defining a detecting area, at least a portion of the detecting area being coincident with the real image formed by the lens element.

26. The device of claim 25, in which the first and second light emitter arrays and the first and second light receptor arrays are configured and disposed to output an output signal corresponding to a coordinate position of an object in the detecting area.

27. The device of claim 26, further comprising a control system receiving the output signal and changing the image displayed on the display device in response to the received output signal.

28. The device of claim 27, in which a predetermined part of the image displayed on the display device is changed to show the switch state of the switch in response to the output signal.

29. The device of claim 28, the control system comprising a switch controller and a display driver, the switch controller receiving the output signal and outputting a control signal in response thereto, the display driver receiving the control signal and transmitting an altered image output to the display device in response to the received control signal.

30. The device of claim 29, the control system further comprising a ROM in electrical communication with the display driver and storing data corresponding to the altered image.

31. The device of claim 24, the first and second light emitter arrays comprising a plurality of LED's.

32. The device of claim 24, the first and second light emitters comprising a plurality of semiconductor laser radiators.

33. The device of claim 24, the first and second light receptor arrays comprising a plurality of phototransistors.

34. The device of claim 24, the first and second light receptor arrays comprising a plurality of photocells.

35. A method for displaying an image comprising:

disposing a surface on a first side of a matrix of lens elements in a position spaced from the matrix of lens elements, the surface having the image displayed thereon, wherein the matrix of lens elements are disposed in a matrix-like configuration and the lens elements are rod-shaped and have a refractive index hat is symmetrical with respect to a longitudinal axis of the lens elements, and observing the image floating in air spaced from a second side of the matrix of lens elements.

* * * * *